United States Patent
Fan

(10) Patent No.: US 8,769,348 B2
(45) Date of Patent: Jul. 1, 2014

(54) ELECTRONIC DEVICE AND METHOD FOR PROTECTING SERVERS AGAINST VIBRATION DAMAGE

(75) Inventor: Chao-Tsung Fan, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 195 days.

(21) Appl. No.: 13/304,412

(22) Filed: Nov. 25, 2011

(65) Prior Publication Data
US 2013/0097454 A1   Apr. 18, 2013

(30) Foreign Application Priority Data
Oct. 17, 2011   (TW) .............................. 100137490 A

(51) Int. Cl.
*G06F 11/00* (2006.01)

(52) U.S. Cl.
USPC ............. 714/47.2; 714/6.11; 714/30; 714/42; 714/47.1

(58) Field of Classification Search
USPC .............. 714/6.11, 25, 30, 40, 42, 47.1, 47.2, 714/47.3
See application file for complete search history.

(56) References Cited

U.S. PATENT DOCUMENTS

| | | | | |
|---|---|---|---|---|
| 7,424,396 | B2* | 9/2008 | Dodeja et al. | 702/185 |
| 2006/0212755 | A1* | 9/2006 | Urmanov et al. | 714/25 |
| 2006/0282709 | A1* | 12/2006 | Shu et al. | 714/100 |
| 2007/0219744 | A1* | 9/2007 | Kolen | 702/150 |
| 2010/0004900 | A1* | 1/2010 | Bougaev et al. | 702/188 |

* cited by examiner

*Primary Examiner* — Joseph D Manoskey
(74) *Attorney, Agent, or Firm* — Novak Druce Connolly Bove + Quigg LLP

(57) ABSTRACT

An electronic device capable of communicating with a plurality of servers includes a storage unit, a vibration unit, a control unit, and a communication unit. The storage unit stores a vibration threshold value. The vibration sensor senses a vibration magnitude of the electronic device. The control unit generates control signals and transmits the control signals to the servers via the communication unit to direct the servers to take certain actions to protect data when the vibration magnitude sensed by the vibration sensor is equal to or greater than the vibration threshold value.

5 Claims, 2 Drawing Sheets

ELECTRONIC DEVICE AND METHOD FOR PROTECTING SERVERS AGAINST VIBRATION DAMAGE

BACKGROUND

1. Technical Field

The present disclosure relates to electronic devices and, more particularly, to an electronic device capable of protecting servers communicating with the electronic device and a method thereof.

2. Description of Related Art

When severe vibration takes place, such as during an earthquake, an user may not have a chance to operate running servers to save data, which cause data loss if the servers are shut down suddenly.

Therefore, what is needed is an electronic device and a method for protecting servers against damage caused by vibration to solve the problem described above.

BRIEF DESCRIPTION OF THE DRAWINGS

Many aspects of the present disclosure should be better understood with reference to the following drawings. The elements in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
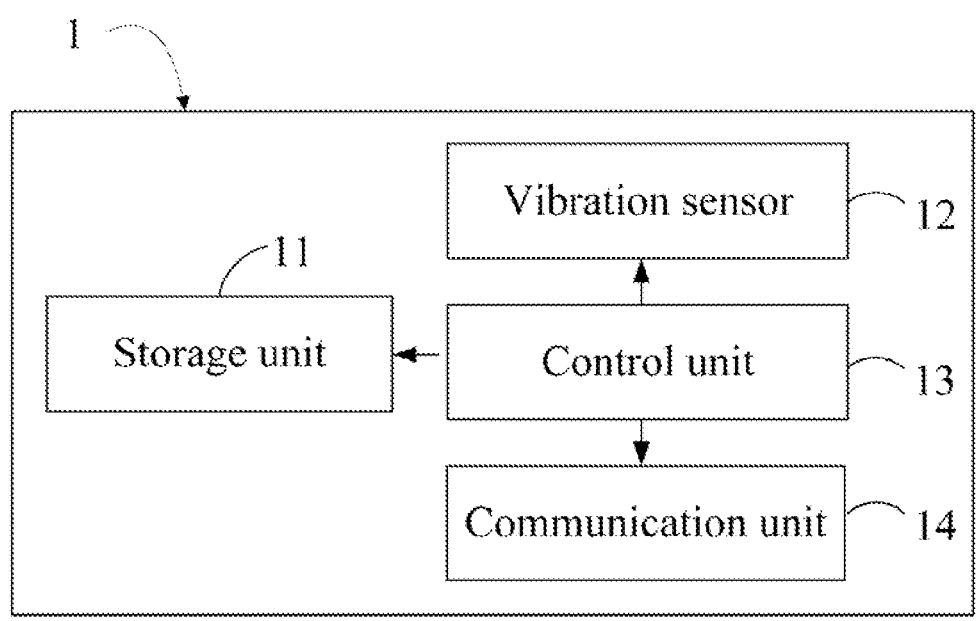
FIG. 1 is a block diagram of an electronic device, in accordance with an embodiment.

FIG. 1 is a block diagram of an electronic device 1 according to an exemplary embodiment. The electronic device 1 can be located in a computer room, and communicates with servers (not shown) located in the computer room. In the embodiment, the electronic device 1 can determine whether a vibration takes place, and generate control signals to direct the servers located in the same environment of the electronic device 1 to take certain actions to protect data from damage once an vibration takes place.

The electronic device 1 includes a storage unit 11, a vibration sensor 12, a control unit 13, and a communication unit 14. The storage unit 11 stores a vibration threshold value. The vibration sensor 12 senses vibration magnitude of the electronic device 1. The control unit 13 compares the vibration magnitude sensed by the vibration sensor 12 with the vibration threshold value. If the vibration magnitude is equal to or greater than the vibration threshold value, the control unit 13 determines that a vibration is taking place, generates control signals and transmits the control signals to the servers via the communication unit 14 to direct the servers to take certain actions to protect data. The communication unit 14 may be a wireless access port or a wired access port. The communication between the electronic device 1 and the servers through the communication unit 14 may be carried out via any suitable network protocol such as TCP/IP, Bluetooth, and IEEE 802.11.

In the embodiment, the control signals includes a signal for saving data, a signal for closing applications which are currently running, and a signal for shutting down the servers.

In the embodiment, the vibration sensor 12 is a three-axis gyroscope capable of sensing X, Y, and Z axis vibration magnitudes in three dimensions. If at least one of the X, Y, and Z axis vibration magnitudes is equal to or greater than the vibration threshold value, the control unit 13 generates control signals to direct the servers to take certain actions to protect data from damage.

Figure 2:
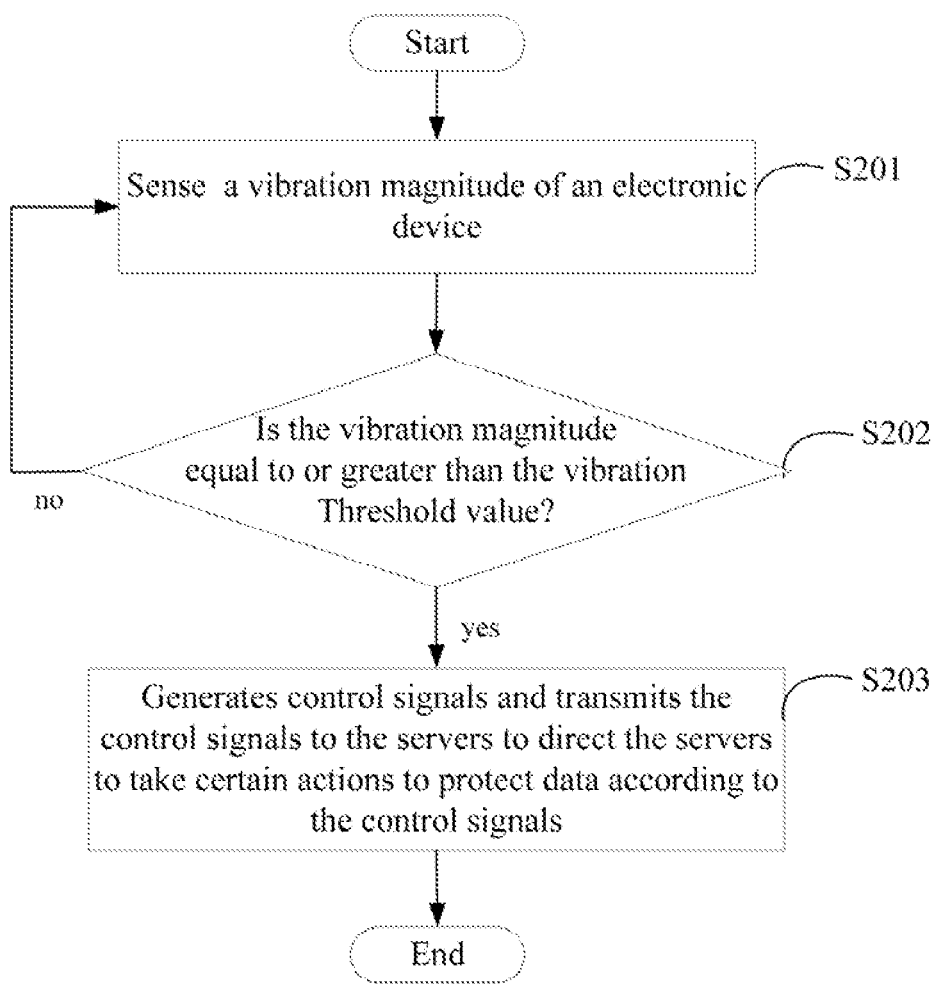
FIG. 2 is a flowchart of a method for protecting servers against vibration damage, in accordance with an embodiment.

FIG. 2 is a flowchart of a method for protecting servers against vibration damage according to an exemplary embodiment.

In step S201, the vibration sensor 12 senses a vibration magnitude.

In step S202, the control unit 13 compares the vibration magnitude sensed by the vibration sensor 12 with the vibration threshold value. If the vibrating magnitude is equal to or greater than the vibration threshold value, the procedures goes to step 203, otherwise, the procedure goes back to step 201.

In step S203, the control unit 13 generates control signals and transmits the control signals to the servers via the communication unit 14 to direct the servers to take certain actions to protect data from damage according to the control signals.

Although the present disclosure has been described in accordance with the embodiments shown, one of ordinary skill in the art will readily recognize that there could be variations to the embodiments and those variations would be within the spirit and scope of the present disclosure. Accordingly, many modifications may be made by one of ordinary skill in the art without departing from the spirit and scope of the appended claims.

What is claimed is:

1. An electronic device comprising:
a storage unit storing a vibration threshold value;
a vibration sensor to sense a vibration magnitude of the electronic device;
a communication unit to wirelessly communicate with a plurality of servers; and
a control unit to generate control signals and transmit the control signals to the servers via the communication unit to direct the servers to take certain actions to protect data when the vibration magnitude sensed by the vibration sensor is equal to or greater than the vibration threshold value, and the control signals comprising a signal for saving data of the servers, a signal for closing applications which are currently running on the servers, and a signal for shutting down the servers.

2. The electronic device as described in claim 1, wherein the vibration sensor senses vibration magnitude in three dimensions, and the control unit is to generate control signals to direct the servers to take certain actions to protect data if the vibration magnitude in at least one of the three dimensions is equal to or greater than the vibration threshold value.

3. The electronic device as described in claim 2, wherein the vibration sensor is a three-axis gyroscope.

4. A method for protecting a plurality of servers against vibration damage applied in an electronic device, the electronic device wirelessly communicating with the plurality of servers, the method comprising:
sensing a vibration magnitude of the electronic device; and
generating control signals and transmitting the control signals to the servers to direct the servers to take certain actions to protect data when the sensed vibration magnitude is equal to or greater than a vibration threshold value, and the control signals comprising a signal for saving data of the servers, a signal for closing applications which are currently running on the servers, and a signal for shutting down the servers.

5. The method as described in claim 4, wherein the vibration magnitude is sensed in three dimensions, and the control signals are generated if the vibration magnitude in at least one of the three dimensions is equal to or greater than the vibration threshold value.

* * * * *